US009765802B2

(12) United States Patent
Gros D'Aillon et al.

(10) Patent No.: US 9,765,802 B2
(45) Date of Patent: Sep. 19, 2017

(54) DEVICE FOR OPTIMIZED PRESSURE SENSING FOR HEATING CHANNELS

(71) Applicant: Commissariat a l'energie atomique et aux ene alt, Paris (FR)

(72) Inventors: Luc Gros D'Aillon, Brie et Angonnes (FR); Jil Gueguen, Grenoble (FR); Fabrice Francois, Chirens (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 216 days.

(21) Appl. No.: 14/386,150

(22) PCT Filed: Mar. 18, 2013

(86) PCT No.: PCT/EP2013/055515
§ 371 (c)(1),
(2) Date: Dec. 18, 2014

(87) PCT Pub. No.: WO2013/139722
PCT Pub. Date: Sep. 26, 2013

(65) Prior Publication Data
US 2015/0107351 A1 Apr. 23, 2015

(30) Foreign Application Priority Data
Mar. 21, 2012 (FR) .................................... 12 52522

(51) Int. Cl.
*G01D 21/00* (2006.01)
*F15B 19/00* (2006.01)
(Continued)

(52) U.S. Cl.
CPC .......... *F15B 19/005* (2013.01); *F16L 41/008* (2013.01); *G01L 19/0007* (2013.01)

(58) Field of Classification Search
CPC ........ F15B 19/00; F16L 41/008; G01L 19/00; G01D 11/30; G01D 11/245; G21C 17/017
(Continued)

(56) References Cited

U.S. PATENT DOCUMENTS 2,705,158 A 3/1955 Risley
3,233,920 A 2/1966 Ammann
(Continued)

FOREIGN PATENT DOCUMENTS

FR 980 482 5/1951
FR 1 447 919 8/1966
(Continued)

OTHER PUBLICATIONS

French Preliminary Search Report issued Feb. 7, 2013 in Patent Application No. 1252522 (with English translation of categories of cited documents).
(Continued)

*Primary Examiner* — John Fitzgerald
*Assistant Examiner* — Truong Phan
(74) *Attorney, Agent, or Firm* — Oblon, McClelland, Maier & Neustadt, L.L.P.

(57) ABSTRACT

A pressure measurement device in a tube (30) of a hydraulic circuit is disclosed, comprising a metal collar (2) provided with n (≥3) contact stops (22, 24, 26) made of an electrically insulating material, designed to come into contact with the wall of said tube, preventing the metal of the collar coming into contact with this wall, one of the contact stops (22) comprising a passage (22') that will connect the atmosphere inside said tube with pressure measurement means.

21 Claims, 4 Drawing Sheets

(51) Int. Cl.
*F16L 41/00* (2006.01)
*G01L 19/00* (2006.01)

(58) Field of Classification Search
USPC .................................................. 73/37, 866.5
See application file for complete search history.

(56) References Cited

U.S. PATENT DOCUMENTS

| | | | | |
|---|---|---|---|---|
| 3,370,856 | A * | 2/1968 | Buske | F16J 15/36 |
| | | | | 277/390 |
| 3,746,370 | A | 7/1973 | Aulisa | |
| 3,810,175 | A * | 5/1974 | Bell | G01S 13/94 |
| | | | | 342/183 |
| 3,918,748 | A | 11/1975 | Acda | |
| 4,158,461 | A | 6/1979 | Francis | |
| 5,199,297 | A | 4/1993 | Lin et al. | |
| 5,988,197 | A * | 11/1999 | Colin | B01L 7/00 |
| | | | | 137/13 |
| 6,390,670 | B1 * | 5/2002 | Nimberger | C08L 79/08 |
| | | | | 374/142 |
| 6,918,312 | B2 * | 7/2005 | Elwood | G01K 15/00 |
| | | | | 374/E15.001 |
| 2003/0226412 | A1 * | 12/2003 | Rumminger | F01N 13/008 |
| | | | | 73/866.5 |
| 2004/0207424 | A1 * | 10/2004 | Hollman | G01R 1/07392 |
| | | | | 324/750.08 |
| 2004/0237277 | A1 | 12/2004 | Gregory | |
| 2005/0155408 | A1 * | 7/2005 | Weyl | G01K 1/14 |
| | | | | 73/23.31 |
| 2008/0202616 | A1 * | 8/2008 | Bergere | B32B 1/08 |
| | | | | 138/33 |
| 2010/0025992 | A1 * | 2/2010 | Spence | F16L 13/142 |
| | | | | 285/379 |

FOREIGN PATENT DOCUMENTS

| | | |
|---|---|---|
| FR | 2 678 350 | 12/1992 |
| GB | 1 021 330 | 3/1966 |
| JP | 49-34786-01 | 6/1972 |
| JP | 54 030273 | 8/1979 |
| JP | 2001-21078 A | 1/2001 |
| JP | U 3160345 | 6/2010 |
| NL | 7 312 742 | 3/1975 |
| WO | 87 07374 | 12/1987 |
| WO | WO 87/07374 A1 | 12/1987 |

OTHER PUBLICATIONS

French Search Report Issued Feb. 1, 2013 in Application No. FR1252522 Filed Mar. 21, 2012.

International Search Report Issued May 8, 2013 in PCT/EP13/055515 Filed Mar. 18, 2013.

* cited by examiner

DEVICE FOR OPTIMIZED PRESSURE SENSING FOR HEATING CHANNELS

TECHNICAL FIELD AND PRIOR ART

The invention relates to the field of pressure measurements on a pipe or a conduit in a hydraulic circuit.

It relates particularly to pressure measurements for which minimum disturbance is desirable. It can be used for a hydraulic circuit that has to be regulated, tested or measured.

Designs and applications of devices comprising such a circuit measure the pressure at different locations. But although standard measurement taps are not intrusive, they do disturb the measurement or the phenomenon to be measured.

The invention aims to solve these problems and particularly to minimise these disturbances, particularly in heating channels.

The installation of a measurement device in direct Joule effect heating channels disturbs the current distribution and therefore the local power, thus invalidating detailed measurements. A direct Joule effect means a Joule effect applied directly in the duct, unlike the "indirect" Joule effect that is applied in a special electrical resistance and that is transmitted to the duct by conduction in various materials including electrical insulators.

At the present time, the technique used consists of welding or screwing a pipe onto a wall of the tube inside which the fluid for which the pressure is to be measured is circulating. This solution is not very satisfactory because it creates current deviations that disturb the measurement and modify the studied phenomenon. In other words, it modifies the local electrical resistance of the heating tube and causes an axial and azimuth redistribution of the electrical heating current and therefore the heat flux.

Another device designed for measuring fluid pressure is disclosed in document WO 87/007374. The system implemented is complex: part of the fluid is deviated by an adjustable tool that disturbs the main flow of the fluid.

The part of the fluid drawn off is then directed to a channel placed approximately parallel to the main flow. The result is a complex path of the fluid to be measured.

Therefore the problem arises of finding a simpler device that is more precise and reliable and that can be adapted particularly to direct Joule effect heating channels.

PRESENTATION OF THE INVENTION

The invention relates firstly to a pressure measurement device in a tube of a hydraulic circuit comprising a metal collar provided with n ($\geq 2$) contact stops made of an electrically insulating material, separated from each other and designed to come into contact with the wall of said tube, preventing the metal of the collar coming into contact with this wall.

If $n \geq 3$, the device can be correctly centred. In a simpler embodiment n=2, the two stops being sufficiently wide to guarantee stability.

One of the contact stops comprises a passage that will connect the atmosphere inside said tube with pressure measurement means.

The collar preferably comprises n reamings in which the n contact stops will fit.

Advantageously, the collar comprises an internal groove to enable limited azimuth clearance of part of the contact stops.

The different assembly clearances of the contact stops are such that their position can be adjusted to the tube and not to the collar, which gives good contact independently of fabrication tolerances. In other words, the azimuth clearance of the stops is such that they can be slightly rotated around the tube.

Means may be provided for centring the passage with an orifice made in the wall of said tube.

Since the contact stop comprises a passage that connects the atmosphere inside said tube with the pressure measurement means, it may comprise a seal or a groove in which a seal can fit. This seal comes into contact with the surface of the tube.

Also preferably, the collar comprises 2 parts and means such as lateral tabs or lateral protuberances for assembly of these 2 parts in a clamped position around a tube.

A method of measuring the pressure in a tube of a hydraulic circuit is also disclosed, this tube comprising at least one pressure measurement orifice, method in which:

a metal collar provided with n ($\geq 2$ or 3) contact stops made of an electrically insulating material is adjusted, applying said stops in contact with the wall of said tube and preventing the metal of the collar from coming into contact with this wall, one of the contact stops comprising a passage that is aligned with one of the pressure measurement orifices of said tube, said passage is connected to pressure measurement means and this pressure is measured.

According to one example, the tube is heated by an electrical current circulating in the wall of the tube to create a direct Joule effect (in the sense already described above, this Joule effect being applied directly in the tube).

The collar may comprise two parts assembled by means to assemble these two parts in a clamped position around the tube.

According to one preferred embodiment of a device or a method, each contact stop comprises a base that extends along a direction connected to a body preferably with a width along a direction approximately perpendicular to said direction, greater than the width of the base along the same direction or along a parallel direction, said direction passing through an external surface S of the base that forms a bearing surface on a tube, when the collar is in position on this tube.

Advantageously, when such a method is being implemented, the centre of the passage is previously made to coincide with the centre of a pressure measurement orifice in said tube by means of a centring pin inserted in the passage of said stop.

Measurements can be made at 2 measurement points on a tube, by placing 2 pressure measurement devices of the type described above around this tube. Thus, a differential pressure and/or a pressure gradient along a tube can be measured.

In a device or a method according to the invention, the contact stops are also preferably made from a thermally insulating material.

Also preferably, the device or the collar described above forms an autoclave assembly when it is in position on a tube of a hydraulic circuit.

According to one example embodiment, the contact stop comprises a passage and also comprises:

a seal, for example an O-ring placed in contact with a bearing surface of this stop in contact with a tube, or a groove formed in this surface, designed to hold said seal, that bears in contact with the surface of a tube on which the device or the collar will be fitted, and/or a groove to hold a radial seal.

These seals may be chosen such that the diameter of the radial seal is greater than the diameter of the seal placed in contact with a bearing surface of the stop, or in a groove formed in this surface.

DETAILED PRESENTATION OF PARTICULAR EMBODIMENTS

Figure 1A:
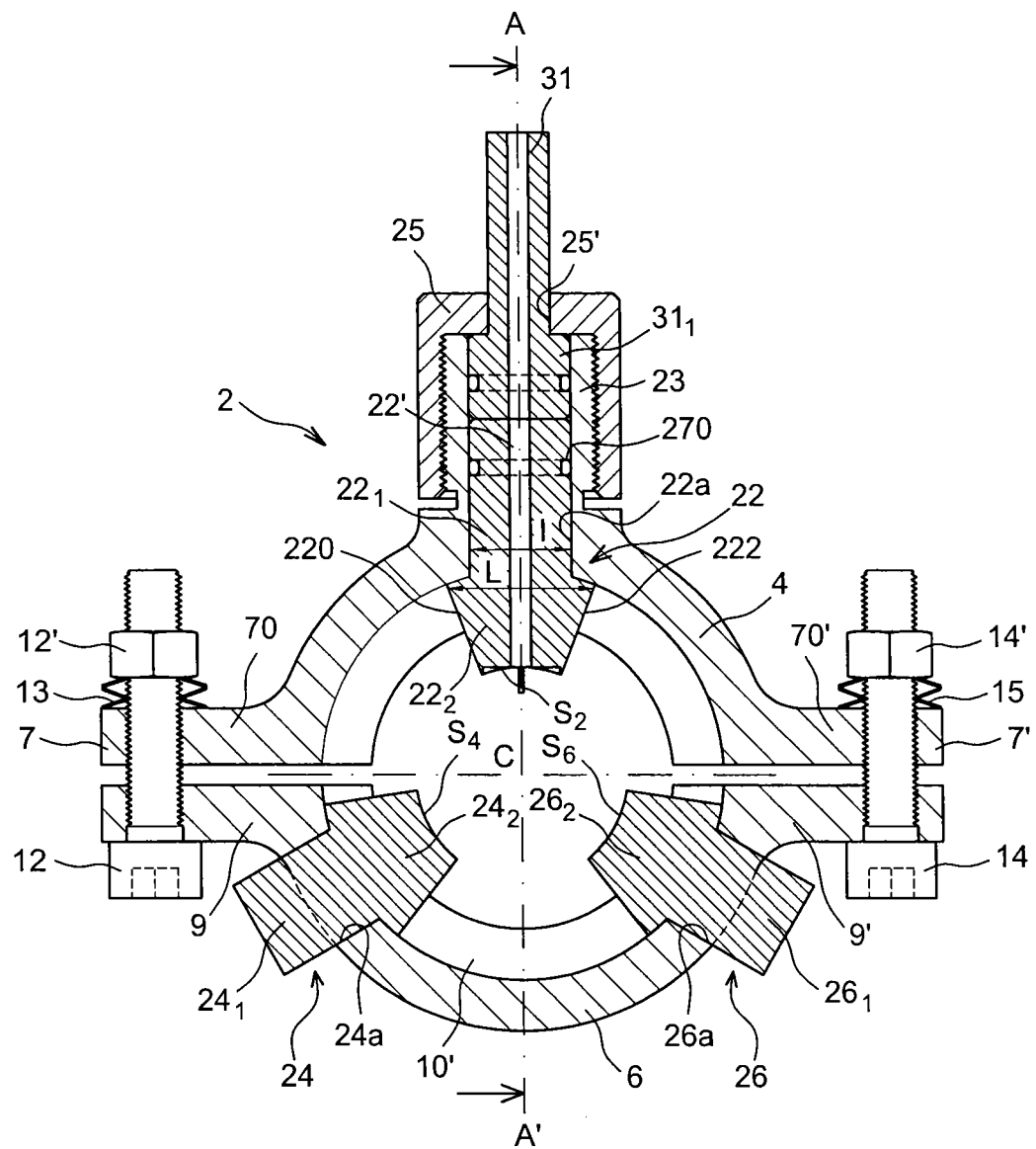
FIGS. 1A and 1B show examples of a device disclosed in this application.
Figure 1B:
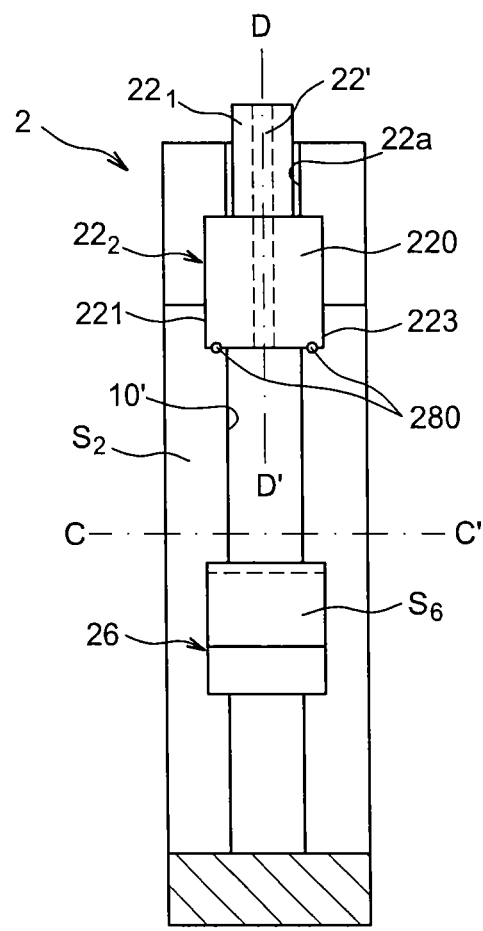

An example embodiment of the invention will be given with reference to FIGS. 1A and 1B, FIG. 1B showing a sectional view on plane AA', of the device in FIG. 1A. This plane AA' is perpendicular to the plane in this FIG. 1A.

The device is a collar 2, for example of the clamping collar type, comprising two parts 4, 6. This collar may be made of a metallic material such as stainless steel.

The inside of the collar defines a circular surface 2' around an axis CC' contained in plane AA', the inside of each part being in the form of a half-collar. These two parts can be assembled by screws 12, 14 and corresponding nuts 12', 14'. The screws are placed in tapped holes made in the lateral tabs or lateral protuberances 7, 9, 7', 9' of each half-collar. At least one washer 13, 15 can be placed between each nut and the external surface 70 of the corresponding lateral protuberance. Preferably a spring washer is used, which contributes to the clamping precision of the collar and its insensitivity to differential expansions.

In the assembled position, the lateral protuberances 7, 9, 7', 9' are facing each other. During clamping, they move towards a plane passing through the axis CC', until they are tight, while leaving a residual clearance.

Figure 2:
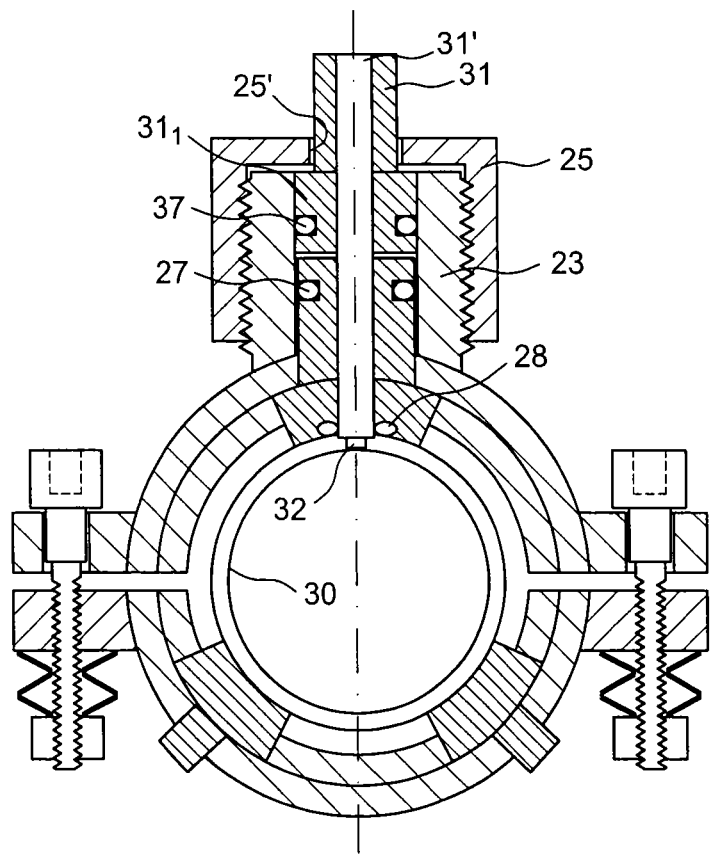
FIG. 2 shows the previous device, in position on the fluid flow tube.

The width of the collar 2 along the CC' axis may be between 15 mm and 25 mm, for example about 20 mm. There will preferably be at least three removable contact or bearing points or pins or stops 22, 24, 26, made of a material providing electrical insulation from the wall of a tube (or pipe or conduit) 30 on which the collar is mounted as can be seen in FIG. 2.

Preferably in one particular embodiment, this material is also a thermal insulator: the thermally insulating stops limit heat losses thus leading to a better quality device, since heat losses are often a problem in tests with heating channels.

Figure 3:
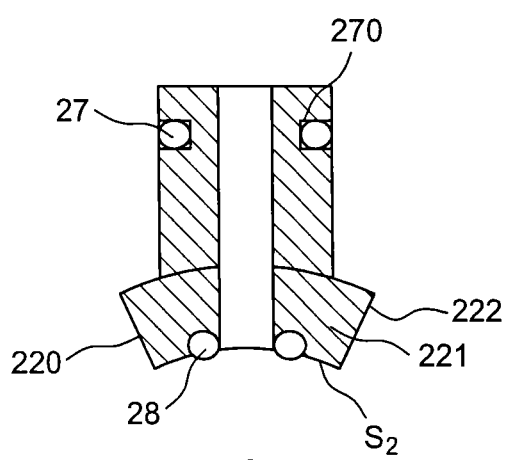
FIGS. 3 and 4 show special aspects of a device as disclosed.

The insulating material may for example be Makrolon, for example with 30% glass fibres or a ceramic, for example zirconia. Reamings $22_a$, $24_a$, $26_a$ are provided in the collar to hold a so-called base $22_1$, $24_1$, $26_1$ of each stop 22, 24, 26, this base extending along a direction DD' (see FIGS. 1B and 3) and preferably being approximately cylindrical for example with a diameter of between 5 mm and 15 mm, for example approximately equal to 10 mm.

Having positioning stops distributed discretely around the periphery of the collar at a spacing from each other and separated by the surrounding atmosphere, minimises thermal disturbances that might be created by positioning of the collar around a measurement tube 30. This positioning stops system also enables precise centring of the device.

Each stop also comprises a body $22_2$, $24_2$, $26_2$ that also extends along direction DD' but is delimited laterally by:

firstly, two surfaces 220, 222, symmetric to each other about a plane such as plane AA' (FIG. 1A) and that are inclined so that they join together in this plane, secondly, two surfaces 221, 223, parallel to each other and approximately perpendicular to the CC' axis and to a direction of fluid flow circulating in a tube 30 on which the device is positioned (see particularly FIG. 2). For example, these two surfaces 221, 223 are separated by a distance of about 10 mm to 15 mm, for example 12 mm.

The zone of the body $22_2$, $24_2$, $26_2$ located at the side of the base has a width L along a direction approximately perpendicular to the DD' axis that is greater than the width l of the base along this same direction or along a parallel direction. The DD' axis passes through an external surface $S_2$, $S_4$, $S_6$ of the body that forms a bearing surface on a tube 30, when the collar is in position on this tube. Therefore, the shape of this surface may be approximately concave and is adapted to the external surface of the tube 30 to come into contact with it and bearing on it. Therefore this external surface $S_2$, $S_4$, $S_6$ will be called the contact surface.

FIGS. 1A and 1B show that a passage 22' is formed in one of the stops 22. This passage 22' is directed along the DD' axis. It can create a contact between the internal atmosphere of a tube 30—inside which a pressure tap drilling 32 is made—and pressure measurement means located outside the tube. Therefore the passage 22' is drilled to the appropriate diameter for the pressure tap, and for example may be between 1 mm and 5 mm, for example equal to about 2 mm.

The leak tightness of the stop 22 that contains this passage may be reinforced relative to the wall of the tube 30 by a seal 28, for example an O-ring, placed in contact with the bearing surface $S_2$ of this stop, or at least partly in a groove 280 formed in this surface. This seal will be compressed by the collar 2 when the collar is in the tightened position around the tube 30 (FIG. 2). The pressure line may then be connected to a tube inserted in the pressure tap passage 22', for example by being welded or installed with a standard connector on the outlet from this tube. A carbon seal (with a curved surface) may be used for high temperature applications, for example hotter than 250° C.

As can be seen in FIG. 1A, a flange 23 retains the base $22_1$ of the stop 22 that comprises the pressure tap passage 22'. This flange comes into contact with a preferably plane bearing portion 40 on the outside surface of the collar.

The outside surface of the flange is threaded so that it can be held in place by a nut 25. As can be seen more clearly in FIGS. 1A and 3, a groove 270 may be made in the base $22_1$ (or around its periphery) into which a seal 27 fits and that will be compressed by nut 25. The radial type seal 27 is compressed by the nut 25 when the nut is in position; but independently of its compression, radial tightening of the seal is defined by its chord diameter, the dimensions of the groove 270 and the inside diameter of the flange 23.

The stop 22 is made such that the inside pressure of the tube is applied to the seal 27 with a larger diameter than seal 28 thus facilitating compression of this seal. It may be an autoclave type assembly. This autoclave effect depends solely on the ratio of the sections of the two seals, the tube being under pressure but not necessarily heating.

The nut 25 has a reaming 25' through which the end of a connection pipe 31 can pass to connect to the pressure measurement means. This pipe is preferably made of stainless steel.

As can be seen in FIGS. 1A and 2, this conduit itself has an end part $31_1$, made from the same material as the pipe 31.

This end part is approximately cylindrical and its diameter is equal to the diameter of the end of the base $22_1$ of the stop 22. It is also inserted into the flange 23 and it may also comprise a groove to hold a seal 37 that will be compressed by the flange when the flange is in the fixed position, held tight by the nut 25. A conduit 31' is defined inside this end part $31_1$ and the pipe 31; it has approximately the same diameter as the conduit 22' and during a pressure measurement, it is positioned facing the conduit as shown in FIG. 2. The assembly formed by the pipe 31 and its end part $31_1$ is reliably leak tight and does not introduce any disturbance into the heat flux or the flow. In one example, the outside diameter of the pipe 31 may be 6 mm (4 mm inside diameter) and be made of stainless steel.

As already mentioned, reamings $22_a$, $24_a$, $26_a$ are provided in the thickness of the collar 2, each along a radial direction of the collar. Each reaming may hold the central body of one of the contact or thrust stops 22, 24, 26 such that each external contact surface $S_2$, $S_4$, $S_6$ is facing the inside of the collar 2 so that it comes into contact with the external surface of the tube 30 clamped by the collar.

The electrically insulating nature of the material forming the stops prevents any contact between metal parts of the collar and a channel on which it is mounted. This aspect is particularly useful for a channel in which a current flows or when this channel is electrically energised.

In the example shown, the 3 stops are placed approximately 120° from each other, which means that a balanced configuration can be made of the bearing forces on a surface of a tube 30 clamped inside the collar. Other configurations are possible. A system with 4 stops may also be used.

As can be seen in FIGS. 1A and 1B, a groove 10' is formed around the periphery of the collar.

To be able to adapt the constituent material of the stops 22, 24, 26 and to obtain optimum contact balancing by self-centring of the stops, the stops can move in a limited manner, with an azimuth movement in the groove 10' of the collar and a radial movement in the corresponding reaming 22A, 24A, 26A.

The wall of the tube 30 is drilled at each pressure measurement point, with a hole or a drilling 32, 42, preferably with the smallest possible diameter compatible with needs (for example 0.5 mm), which will be practically the same as the diameter of the reaming made in the stop 22. For this drilling 32, it is preferred to have a sufficiently small diameter equal to a few tenths of a millimeter, for example between 0.1 mm and 0.8 mm, to induce negligible disturbance in the local electrical resistance of a tube 30 when it is a heating tube.

The means $31_1$, 31 connect the output from each drilling 32 to a pressure line.

Figure 4:
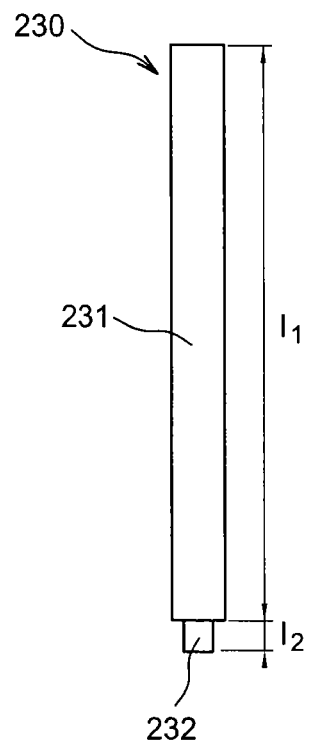

In the tightened position of the collar around the tube 30, the reaming 22' of the contact stop 22 enabling the pressure tap is concentric with the drilling 32 in the tube 30. A removable centring pin 230 shown diagrammatically in FIG. 4 is used to maintain this centring while the collar is being tightened on the tube. In the example shown, it comprises:

a body 231, for example with a length $l_1$ of about 40 mm; its diameter is adapted to the diameter of the reaming 22', for example about 2 mm, an end or a lug 232, for example with a length $l_2$ of about 2 mm; its diameter is adapted to the diameter of a pressure tap orifice 32 made in a tube 30 (see FIG. 2), for example about 0.5 mm.

This pin is inserted into the reaming 22' of the stop 22, and its end is held in place in contact with the wall of the tube 30 until it can penetrate into the pressure tap drilling 32. The reaming 22' of the stop 22 is then aligned with it and the stop 22 is in the measurement position. After clamping the collar 2, the centring pin is removed and the pressure line is connected, the collar being clamped independently of the nut 25 and the centring pin being able to pass through the pipe 31.

This type of device is suitable for an installation dedicated to research on a two-phase flow in a heating channel, particularly of the type heated by the direct Joule effect (an electric current circulating in its wall).

Figure 5:
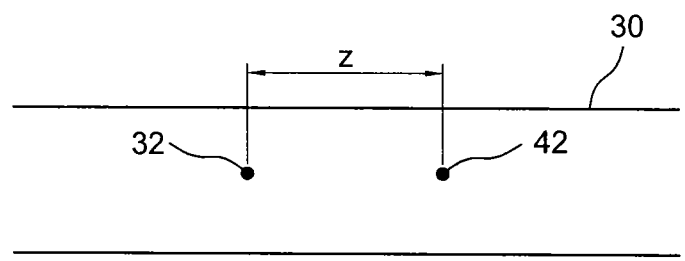
FIG. 5 shows an embodiment for pressure measurements at 2 different points.

This type of device is also adapted to a pressure gradient measurement at 2 points separated by a distance z, as shown in FIG. 5.

At each of these points, a drilling 32, 42 is made for a pressure measurement. A collar or an assembly 2 like that described above is put into position around the pipe 30, at each of the drillings 32, 42. Thus with 2 collars, 2 simultaneous pressure measurements can be made. These measurements can be used to very quickly determine a pressure gradient between the two flow measurement points. In other words, precise and sensitive differential pressure measurements can be made to provide information about the local pressure gradient under different flow rates.

Measurements with a wide pressure range from low differential pressures (a few millibars, for example 10 mbars) to a high static pressure (30 bars) may be made with good relative precision.

If the temperature and pressure in the tube are below 100° C. and 30 bars respectively, the seal 18 may be made of elastomer and the metal collar 10 is designed to resist the appropriate tightening pressure, the thrust stops 22, 24, 26 forming contact points being made from Makrolon.

At higher temperatures and pressures, the seal 18 is preferably made from carbon or annealed copper and the thrust stops 22, 24, 26 are made from an alumina or zirconia type ceramic. The stops are preferably made of zirconia which is a better thermal insulator than alumina.

A device like that described above can be adapted to different temperature ranges that may occur in different measurement environments. In particular, the material from which the removable stops 22, 24, 26 are made can be adapted as a function of the temperature. The assembly collar 2 according to the invention can provide expansion compensation, particularly in the case of large temperature variations in the same measurement.

Such a device can also be easily positioned around a tube 30, alignment being made much easier through the use of stops 22, 24, 26, clamping being made by attachment means placed in the lateral tabs as shown in FIG. 1A.

This provides mechanical strength, positioning precision and leak tightness to assure the required reliabilities in a single operation.

In one example, measurements were made on a tube inside which a fluid containing freon 134A circulates as a heat transporting fluid, at a pressure of 30 bars and 110° C. The heating channel is a tube with an outside diameter of 19.2 mm heated by direct Joule effect, by an electric current circulating in the wall.

According to another example, the heat transporting fluid may be water circulating at a mass flow of between 0.5 and 5 Mg/s/m$^2$, at a temperature of at least 20° C., transporting a power for example of between 0.5 and 3 MW/m$^2$ at a pressure of between 20 and 200 bars.

The invention claimed is:

1. A pressure measurement device in a tube of a hydraulic circuit, comprising:

a metal collar having n≥2 contact stops made of an electrically insulating material, each of said contact stops having a contact surface for contacting a wall of said tube and preventing the metal collar from coming into contact with the wall of said tube, each contact stop having a body with a first width greater than a second width farther removed from the contact surface than the first width, said second width dimensioned to fit inside a reaming of the collar, and one of the contact stops comprising a passage connected to an atmosphere inside said tube, when the collar is in position around said tube.

2. The device according to claim 1, wherein said metal collar comprises n reamings in which the n contact stops fit.

3. The device according to claim 1, wherein each contact stop comprises:

a base, that extends along a first direction, connected to a body having said first width along a second direction substantially perpendicular to the first direction;

said first width being greater than said second width of the base along said second direction or along a parallel direction; and the first direction passing through an external surface S of the body that forms the contact surface on the tube, when the collar is in position around said tube.

4. The device according to claim 1, wherein said metal collar comprises an internal groove to limit azimuthal clearance of at least one of the contact stops.

5. The device according to claim 1, further comprising a centering mechanism which centers the passage with an orifice formed in the wall of said tube, when the collar is in position around said tube.

6. The device according to claim 1, the collar comprising two parts to be assembled in a clamped position around the tube.

7. The device according to claim 1, wherein each of the contact stops comprises a thermally insulating material.

8. The device according to claim 1, wherein the tube is a component of an autoclave assembly of the hydraulic circuit.

9. The device according to claim 1, wherein one of the contact stops comprises:

a passage connected to the atmosphere inside said tube; and a seal mechanism which seals the passage to ensure leak tightness.

10. The device according to claim 9, wherein the seal mechanism comprises a seal placed in contact with the contact surface of the contact stop, when said contact surface is in contact with the tube, or placed in a groove formed in the contact surface designed to hold said seal.

11. The device according to claim 9, wherein the seal mechanism comprises a groove to hold a radial seal.

12. The device according to claim 9, wherein the seal mechanism comprises:

a seal placed in contact with the contact surface of said one of the contact stops, when said contact surface is in contact with the tube, or placed in a first groove formed in the contact surface designed to hold said seal.

13. The device according to claim 12, wherein the seal mechanism comprises:

a second groove to hold a radial seal, the diameter of the radial seal being greater than the diameter of the seal placed in contact with the contact surface of the contact stop, or placed in a groove formed in the contact surface.

14. A method of measuring a pressure in a tube of a hydraulic circuit, said tube comprising at least one pressure measurement orifice, said method comprising:

adjusting a metal collar provided with n≥2 contact stops made of an electrically insulating material by applying a contact surface of said stops in contact with a wall of said tube and preventing the metal collar from coming into contact with the wall, each contact stop having a body with a first width greater than a second width farther removed from the contact surface than the first width, said second width dimensioned to fit inside a reaming of the collar, and one of the contact stops comprising a passage that is aligned with one of the pressure measurement orifices of said tube; and measuring the pressure in said passage.

15. The method according to claim 14, further comprising:

heating the tube by an electrical current circulating in the wall of the tube to create a direct Joule effect.

16. The method according to claim 14, wherein the metal collar comprises two parts assembled in a clamped position around the tube.

17. The method according to claim 14, wherein each contact stop comprises:

a base, that extends along a first direction, connected to a body having a width along a second direction substantially perpendicular to the first direction;

said first width being greater than said second width of the base along said second direction or along a parallel direction; and the first direction passing through an external surface S of the body that forms the contact on the tube, when the collar is in position around said tube.

18. The method according to claim 14, further comprising:

centering the passage with a pressure measurement orifice in said tube by way of a centering pin inserted in the passage of said contact stop.

19. The method according to claim 14, further comprising:

sealing the passage with a seal, placed in contact with the contact surface of the contact stop in contact with the tube, or placed in a groove formed in the contact surface designed to hold said seal.

20. The method according to claim 14, further comprising:

sealing the passage with a radial seal disposed in a groove that holds the radial seal.

21. The method according to claim 14, further comprising forming an autoclave assembly with said tube of the hydraulic circuit.

* * * * *